United States Patent
Sudabattula et al.

(10) Patent No.: US 9,172,418 B1
(45) Date of Patent: Oct. 27, 2015

(54) USER IDENTITY MODULE PROTOCOL SWITCH

(71) Applicant: QUALCOMM Incorporated, San Diego, CA (US)

(72) Inventors: Samatha Sudabattula, Hyderabad (IN); Shyam Singh, Hyderabad (IN); Jose Alfredo Ruvalcaba, Poway, CA (US); Jayesh Sharma, San Carlos, CA (US)

(73) Assignee: QUALCOMM INCORPORATED, San Deigo, CA (US)

( * ) Notice: Subject to any disclaimer, the term of this patent is extended or adjusted under 35 U.S.C. 154(b) by 0 days.

(21) Appl. No.: 14/292,014

(22) Filed: May 30, 2014

(51) Int. Cl.
*H04M 1/00* (2006.01)
*H04B 1/3816* (2015.01)
*H04W 8/18* (2009.01)

(52) U.S. Cl.
CPC ............. *H04B 1/3816* (2013.01); *H04W 8/183* (2013.01)

(58) Field of Classification Search
CPC ........ H04M 1/00; G06K 19/07; H04B 1/3816
See application file for complete search history.

(56) References Cited

U.S. PATENT DOCUMENTS

| | | | |
|---|---|---|---|
| 6,439,464 B1 | 8/2002 | Fruhauf et al. | |
| 6,772,956 B1 | 8/2004 | Leaming | |
| 6,801,956 B2 | 10/2004 | Feuser et al. | |
| 6,913,196 B2 | 7/2005 | Morrow et al. | |
| 8,060,673 B2* | 11/2011 | Lu et al. | 710/72 |
| 8,442,586 B2 | 5/2013 | Danis et al. | |
| 2004/0238644 A1* | 12/2004 | Leaming | 235/492 |
| 2005/0240695 A1* | 10/2005 | Leaming | 710/104 |
| 2009/0280865 A1* | 11/2009 | Danis et al. | 455/558 |
| 2010/0095063 A1* | 4/2010 | Koraichi et al. | 711/115 |
| 2010/0224684 A1 | 9/2010 | Bonnin et al. | |
| 2013/0237286 A1 | 9/2013 | Danis et al. | |

OTHER PUBLICATIONS

International Search Report and Written Opinion—PCT/US2015/024987—ISA/EPO—Jun. 18, 2015.

\* cited by examiner

*Primary Examiner* — Bobbak Safaipour
(74) *Attorney, Agent, or Firm* — Procopio, Cory, Hargreaves & Savitch LLP

(57) ABSTRACT

A method for switching a Universal Integrated Circuit Card (UICC) transmission protocol includes: setting an operational mode of the UICC to an ISO 7816-12 USB UICC transmission protocol mode (USB mode); and in response to a user input, enabling the UICC to fallback from the USB mode to an ISO 7816-3 T=0/T=1 transmission protocol mode (ISO mode).

30 Claims, 4 Drawing Sheets

USER IDENTITY MODULE PROTOCOL SWITCH

BACKGROUND

A Universal Integrated Circuit Card (UICC) is a smart card used in mobile communication devices in Global System for Mobile communications (GSM), Universal Mobile Telecommunications System (UMTS), and Code Division Multiple Access (CDMA) networks. UMTS uses Wideband Code Division Multiple Access (WCDMA) radio access technology.

A UICC may contain several applications, making it possible for the same smart card to provide access to the different networks. In a GSM or UMTS network, a subscriber identity module (SIM) application or a universal SIM (USIM) application on the UICC can be provisioned, and in a CDMA network, a CDMA SIM (CSIM) application or a removable user identity module (R-UIM) can be provisioned. The UICC can be inserted into CDMA, GSM, or UMTS mobile communication devices. A Universal Serial Bus (USB) interface is used for connections between the UICC and the main chipset of a mobile communication device using the ISO 7816-12 USB UICC transmission protocol.

In addition to the ISO 7816-12 USB UICC transmission protocol, the ISO 7816-3 T=0/T=1 transmission protocol is supported for mobile communication devices including Long Term Evolution (LTE) enabled mobile communication devices. When the USB UICC transmission protocol is supported by a mobile communication device and the UIM powers up in the ISO 7816-12 USB UICC transmission protocol mode (USB mode), power consumption increases over the legacy ISO 7816-3 T=0/T=1 transmission protocol mode (ISO mode).

However, since conserving battery life has become a requirement for mobile communication devices, operating a mobile communication device in the ISO protocol mode may sometimes be preferable to operation in the USB mode.

SUMMARY

Apparatuses and methods for providing fallback from the ISO 7816-12 USB UICC transmission protocol mode to ISO 7816-3 T=0/T=1 transmission protocol mode for a mobile communications device are provided.

According to various embodiments there is provided a mobile communication device. The mobile communication device may include: a first processor configured to set an operational mode of a Universal Integrated Circuit Card (UICC) to an ISO 7816-12 USB UICC transmission protocol mode (USB mode); and a second processor configured to, in response to a user input, enable the UICC to fallback from the USB mode to an ISO 7816-3 T=0/T=1 transmission protocol mode (ISO mode).

According to various embodiments there is provided a mobile communication device. The mobile communication device may include: a Universal Integrated Circuit Card (UICC) configured to operate in an ISO 7816-12 USB UICC transmission protocol mode (USB mode) and an ISO 7816-3 T=0/T=1 transmission protocol mode (ISO mode). The first processor may be configured to cause the UICC to power up in the USB mode, and if the UICC does not power up in the USB mode and fallback is enabled, to switch the operational mode of the UICC from the USB mode to the ISO mode.

According to various embodiments there is provided a method for switching a Universal Integrated Circuit Card (UICC) communication protocol. The method may include: setting an operational mode of the UICC to an ISO 7816-12 USB UICC transmission protocol mode (USB mode); and in response to a user input, enabling the UICC to fallback from the USB mode to an ISO 7816-3 T=0/T=1 transmission protocol mode (ISO mode).

According to various embodiments there is provided a non-transitory computer readable medium having stored therein a program for making a processor execute a method for switching a Universal Integrated Circuit Card (UICC) transmission protocol. The program may include processor executable instructions for performing operations including: causing the UICC to power up in an ISO 7816-12 USB UICC transmission protocol mode (USB mode); and switching the operational mode of the UICC from the USB mode to an ISO 7816-3 T=0/T=1 transmission protocol mode (ISO mode) if the UICC does not power up in the USB mode and fallback is enabled.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Various embodiments provide methods for switching operation of a UICC between the ISO 7816-12 USB UICC and ISO 7816-3 T=0/T=1 transmission protocols. Power may be conserved by providing user options to switch to the ISO 7816-3 T=0/T=1 transmission protocol (ISO mode) from the ISO 7816-12 USB UICC transmission protocol (USB mode) as well as automatic fallback from the USB mode to the ISO mode under specified conditions when certain criteria are met. As defined in this disclosure, fallback is a change in the operational mode of the UICC 120 from using the ISO 7816-12 USB UICC transmission protocol, referred to herein as USB mode, to using the ISO 7816-3 T=0/T=1 transmission protocol, referred to herein as the ISO mode.

Figure 1:
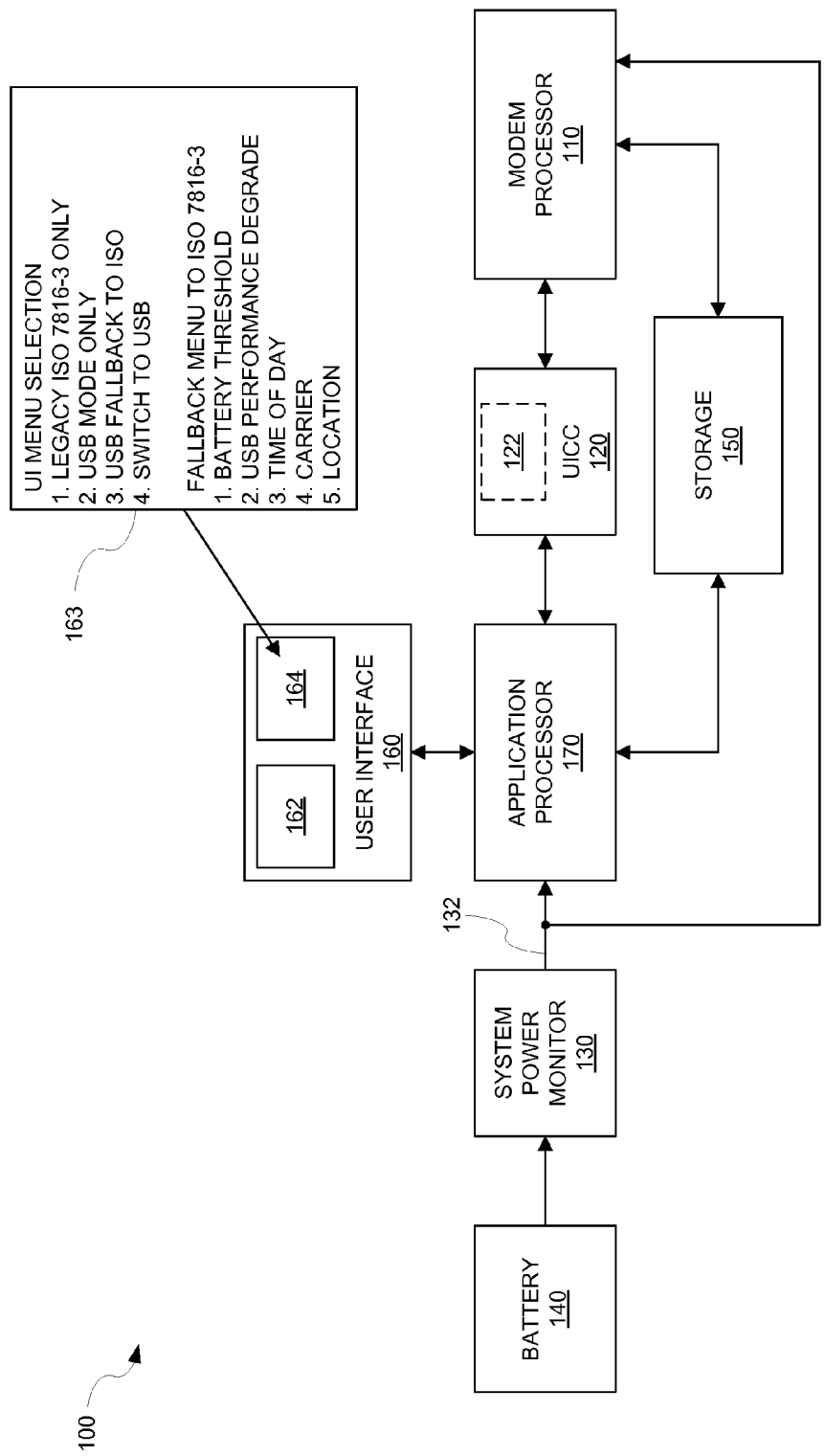
FIG. 1 is a block diagram illustrating portions of a mobile communication device according to various embodiments.

FIG. 1 is a block diagram illustrating relevant portions of a mobile communication device 100 according to various embodiments. As illustrated in FIG. 1, the mobile communication device 100 may include a modem processor 110 (also referred to herein as a first processor), a UICC 120, a system power monitor unit 130, a battery 140, a storage, 150, a user interface unit 160, and an application processor 170 (also referred to herein as a second processor). The mobile communication device 100 may be, for example but not limited to, a mobile telephone, smartphone, tablet, computer, etc., capable of communications with one or more wireless networks.

The modem processor 110 may be, for example, but not limited to, a microprocessor, microcontroller, or other programmable device. In various example embodiments, the modem processor 110 may be integrated into the application processor 170. In various example embodiments, the modem processor 110 may be separate from the application processor 170. The modem processor 110 may be configured control modem operation and provide signal processing for one or more radio access technologies (RAT), for example, but not limited to CDMA, WCDMA, TDMA, GSM, etc. One of ordinary skill in the art will appreciate that mobile communication device 100 may include more than one modem configured to operate on the same or different radio access technologies.

The UICC 120 may include, an application 122, for example, but not limited to, a SIM application, a USIM application, a CSIM application, and/or an R-UIM application. The UICC 120 may communicate with the modem processor 110 and the application processor 170 of a mobile communication device 100 using the ISO 7816-12 USB UICC transmission protocol and/or the ISO 7816-3 transmission protocol.

The system power monitor unit 130 may be configured to monitor battery 140 power by monitoring the voltage level of and/or current supplied from the battery 140 and provide a signal to the application processor 170 and/or the modem processor 110 indicating the voltage level and/or supply current.

The user interface unit 160 may include an input device 162, for example, but not limited to a keyboard, touch panel, or other human interface device, and a display device 164, for example, but not limited to, a liquid crystal display (LCD), light emitting diode (LED) display, or other video display. One of ordinary skill in the art will appreciate that other input and display devices may be used without departing from the scope of the present inventive concept.

The application processor 170 may be a programmable device, for example, but not limited to, a microprocessor or microcontroller, and may control overall operation of the mobile communication device 100 including execution of various software applications and programs.

The application processor 170 may control switching of the UICC 120 operational mode between USB mode and ISO mode. Alternatively or additionally, control of switching the UICC 120 operational mode between USB mode and ISO mode may be performed by another processor, for example, but not limited to, the modem processor 110, in the mobile communication device 100.

The storage 150 may store applications and/or programs necessary for operation of the mobile communication device 100 that are executed by the application processor 170 and/or modem processor 110, as well as application data and user data.

In various embodiments, UICC 120 fallback from the USB mode to the ISO mode may occur automatically under certain conditions, for example, but not limited to, when the host cannot enumerate the UICC 120 in USB mode, the host enumerates the UICC 120 in USB mode but cannot complete the USB reset procedure successfully, the host does not receive an Answer-to-Reset (ATR) or receives a corrupt ATR from UICC 120 in USB mode, or when the host continues to encounter UICC 120 transaction failures (e.g., errors or timeouts) exceeding a maximum number of recovery attempts during USB mode of operation and is unable to recover.

Figure 2:
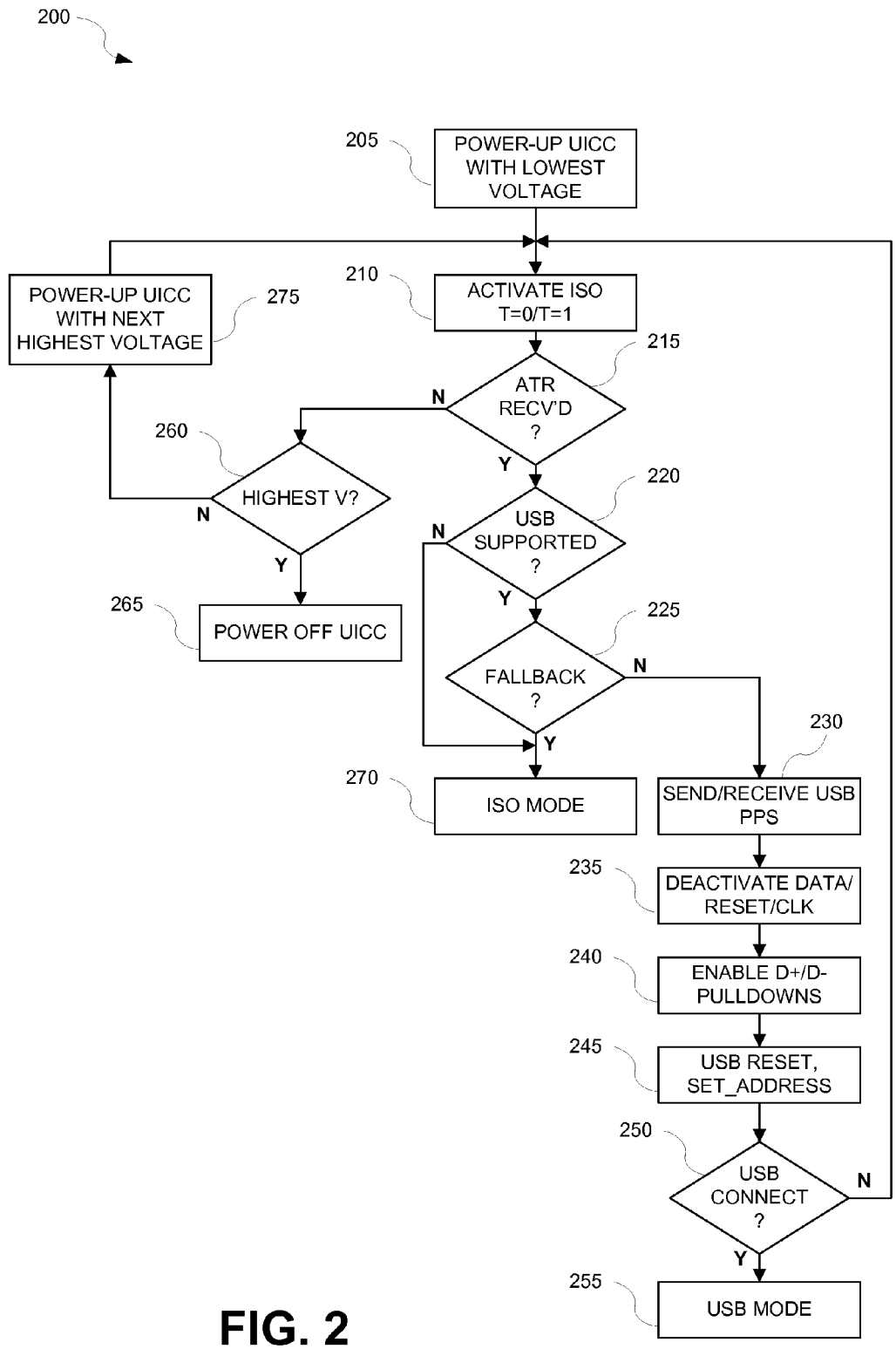
FIG. 2 is a flowchart illustrating a power-up method for a UICC according to various embodiments.

The modem processor 110 may control whether the UICC 120 powers up in the ISO mode or the USB mode. FIG. 2 is a flowchart illustrating a power-up method 200 for a UICC (e.g., 120 in FIG. 1) according to various embodiments. Referring to FIGS. 1 and 2, the modem processor 110 may send a reset command to cause the UICC 120 to power up at the lowest UICC voltage (205). There are three operating voltages for the UICC 120: 5 V, 3 V and 1.8 V (ISO/IEC 7816-3 classes A, B and C, respectively). ISO 7816-3 T=0/T=1 transmission protocol mode (i.e., ISO mode) may be activated for initial communication between the modem processor 110 and the UICC 120 (210).

The modem processor 110 may wait for an Answer-To-Reset (ATR) (215). If the UICC 120 returns an ATR (215-Y), the ATR will indicate whether the ISO 7816-12 USB UICC transmission protocol (i.e., USB mode) is supported (220). If the UICC 120 does not support USB mode (220-N), the modem processor 110 may activate the ISO mode of operation for the UICC 120 (270). If the UICC 120 supports USB mode (220-Y), the modem processor 110 may determine whether fallback from the USB mode to the ISO mode has been enabled (225).

If fallback from the USB mode to the ISO mode has not been enabled (225-N), the modem processor 110 may enumerate the UICC 120 in USB mode by sending a USB Protocol and Parameter Selection (PPS) command to the UICC 120 and receiving a PPS response from the UICC 120 (230), deactivating the data, reset, and clock lines (235), enabling the pull down resistors on the D+ and D− lines (240), and sending USB reset and addressing commands to the UICC 120 (245). If the UICC 120 connects within 20 mS (250-Y), the UICC 120 may operate in USB mode (255).

If the UICC 120 does not connect within 20 mS (250-N), ISO mode may be activated (210) and, if an ATR is not received (215-N), the modem processor 110 may determine if the highest operating voltage (i.e., 5V) has been applied to power-up the UICC 120 (260). If the highest operating voltage was not previously applied to power-up the UICC 120 (260-N), the UICC 120 operating voltage may be increased and the UICC powered up with the increased operating voltage (275). ISO mode may again be activated (210) and, if an ATR is not received (215-N) and the highest operating voltage was applied to power-up the UICC 120 (260-Y), the UICC 120 may be powered off (265).

In various embodiments, additional conditions for fallback from the USB mode to the ISO mode or from ISO mode to USB mode may be user controlled, modem processor 110 controlled, and/or application processor 170 controlled.

Under user control, the user interface unit 160 may present one or more menus 163 of options for determining operation of the UICC 120 on the display device 164. Selection of options from the one or more menus 163 via the input device 162 may include, for example, but not limited to, enable/disable the fallback option and/or set the mode of operation of the UICC 120. The fallback option may be enabled and/or disabled as a default or the fallback option may be changed at any other time via selection of options from the one or more menus 163. Additionally or alternatively, operation of the UICC 120 as USB mode only or ISO mode only may be selected. USB only mode or ISO only mode may be set as a default mode by the user or may be changed at any other time via menu selection.

When the fallback option is enabled, UICC 120 fallback from the USB mode to the ISO mode may be initiated by the application processor 170 based on a battery 140 power threshold level determined by the application processor 170 and/or the modem processor 110. When battery 140 power falls below the battery 140 power threshold level, fallback from the USB mode to the ISO mode may be initiated. Similarly, when battery 140 power subsequently rises above the battery 140 power threshold level, for example, the mobile communication device 100 operating power requirements decrease, fallback from the ISO mode to the USB mode may be initiated.

The battery 140 power level may be monitored by the system power monitor unit 130. One of ordinary skill in the art will appreciate that devices and methods for power monitoring are known in the art and need not be further described. The system power monitor unit 130 may provide a power indicator signal 132 to the application processor 170 and/or the modem processor 110. A battery 140 minimum power threshold level may be determined based on, for example, a remaining percentage of battery 140 voltage compared to a fully charged battery 140 and an estimate of required current for operation of the mobile communication device 100.

The estimate of required current may be based on the present supply current and operating requirements of the application processor 170, for example, but not limited to, the number of applications being executed, and/or operating requirements of the modem processor 110, for example, but not limited to, the signal processing requirements of an active radio access technology. The required current may be estimated by the application processor 170 and/or the modem processor 110.

If the battery 140 minimum power threshold level is reached based on the modem processor 110 operating requirements, the modem processor 110 may cause the application processor 170 to initiate UICC 120 fallback from the USB mode to the ISO mode. If the battery 140 minimum power threshold level is reached based on the application processor 170 operating requirements, the application processor 170 may initiate UICC 120 fallback from the USB mode to the ISO mode.

If the modem processor 110 operating requirements are reduced such that the battery 140 level power rises above the battery 140 minimum power threshold level, the application processor 170 may initiate UICC 120 fallback from the ISO mode to the USB mode. Similarly, if the application processor 170 operating requirements are reduced such that the battery 140 power level rises above the battery 140 minimum power threshold level, the application processor 170 may initiate UICC 120 fallback from the ISO mode to the USB mode.

Additionally or alternatively, the battery 140 minimum power threshold level for UICC 120 fallback from the USB mode to the ISO mode may be preset by the user, for example during initial setup of the mobile communication device 100. In various embodiments, the user interface unit 160 may present one or more menus 163 on the display device 164 to permit a user to set the battery 140 minimum power threshold level via the input device 162 at which the application processor 170 causes the UICC 120 to switch from USB mode to ISO mode.

When fallback is enabled, UICC 120 fallback from USB mode to ISO mode may also occur when USB performance degrades, i.e., inability of the UICC to communicate in the USB mode, for example, but not limited to, when battery 140 power is too low but a battery 140 power level threshold has not been set. Other conditions that may initiate UICC 120 fallback from the USB mode to the ISO mode include, but are not limited to, time of day, network services provider (i.e., carrier), location of the mobile communication device 100, etc. When one or more of the fallback conditions is met, the first processor 110 or the second processor 170 may be configured to enable the UICC 120 to fall back from the USB mode to the ISO mode.

Figure 3:
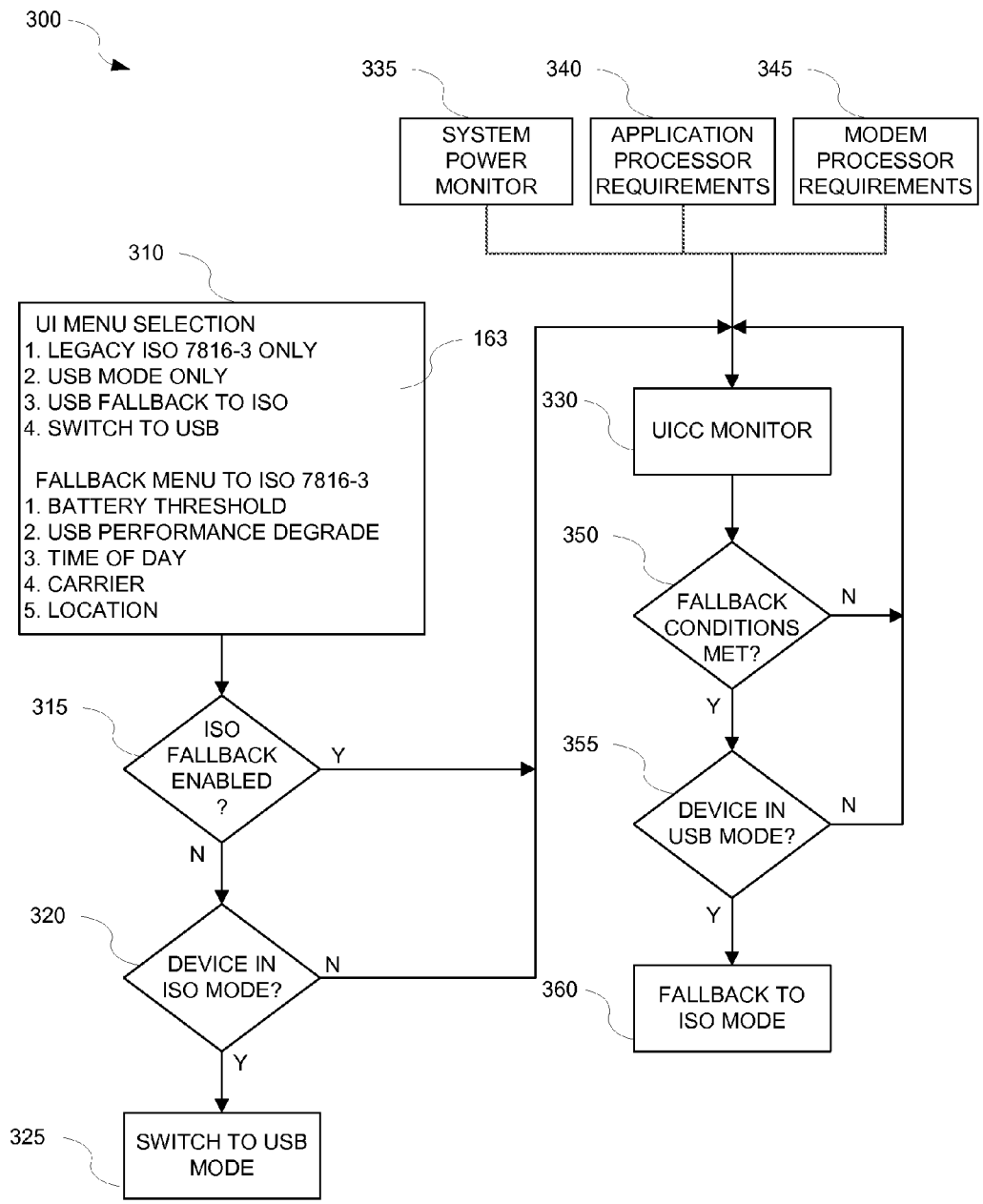
FIG. 3 is a flow diagram illustrating a method for applying fallback conditions according to various embodiments.

FIG. 3 is a flow diagram illustrating a method 300 for applying fallback conditions according to various embodiments. With reference to FIGS. 1-3, the user interface unit 160 may present one or more menus 163 on the display device 164 providing user options for, for example, but not limited to, selection of USB mode only or ISO mode only, enabling fallback, and/or switching back to USB mode after fallback from the USB mode to the ISO mode. If fallback is enabled, menu options may include user settable conditions for determining when fallback from the USB mode to the ISO mode may occur, for example, but not limited to, a battery 140 minimum power level threshold, USB performance, time of day, network services provider (i.e., carrier), location of the mobile communication device 100, etc. (310).

Referring to the method 300, if fallback has not been enabled (315-N), and the UICC 120 is in ISO mode (320-Y), the UICC 120 is switched to USB mode (325). If fallback has been enabled (315-Y), or the UICC 120 is not in ISO mode (320-N), the UICC 120 is monitored by the application processor 170 to determine if the fallback conditions have been met (330). The fallback conditions include input from the system power monitor unit 130 (335), application processor 170 power requirements (340), and modem processor 110 power requirements (345) as described. The power requirements of the application processor 170 and the modem processor 110 may be determined by, for example, but not limited to, the number of application programs executing, operating system conditions, signal processing requirements, etc. If the battery 140 minimum power level threshold is not set by the user, the battery 140 minimum power level threshold may be set by the application processor 170 or the modem processor 110 based on their estimated operating requirements as described.

In various embodiments, satisfaction of one or more predetermined criteria may also be required before fallback from the USB mode to the ISO mode may be enabled. For example, fallback from the USB mode to the ISO mode may not be allowed when a data or voice call is in process. Fallback from the USB mode to the ISO mode may be allowed when the mobile communication device 100 is in an idle mode. Fallback from the USB mode to the ISO mode may be conditioned on inputs from external modules. For example, multimedia applications modules currently accessing the UICC 120 in USB mode may prevent fallback from the USB mode to the ISO mode.

If the fallback conditions have not been met (350-N) or the UICC 120 is not in USB mode (355-N), monitoring of the UICC 120 continues (330). If the fallback conditions have been met (350-Y) and the UICC 120 is in USB mode (355-Y), the UICC may fall back to ISO mode (360).

Figure 4:
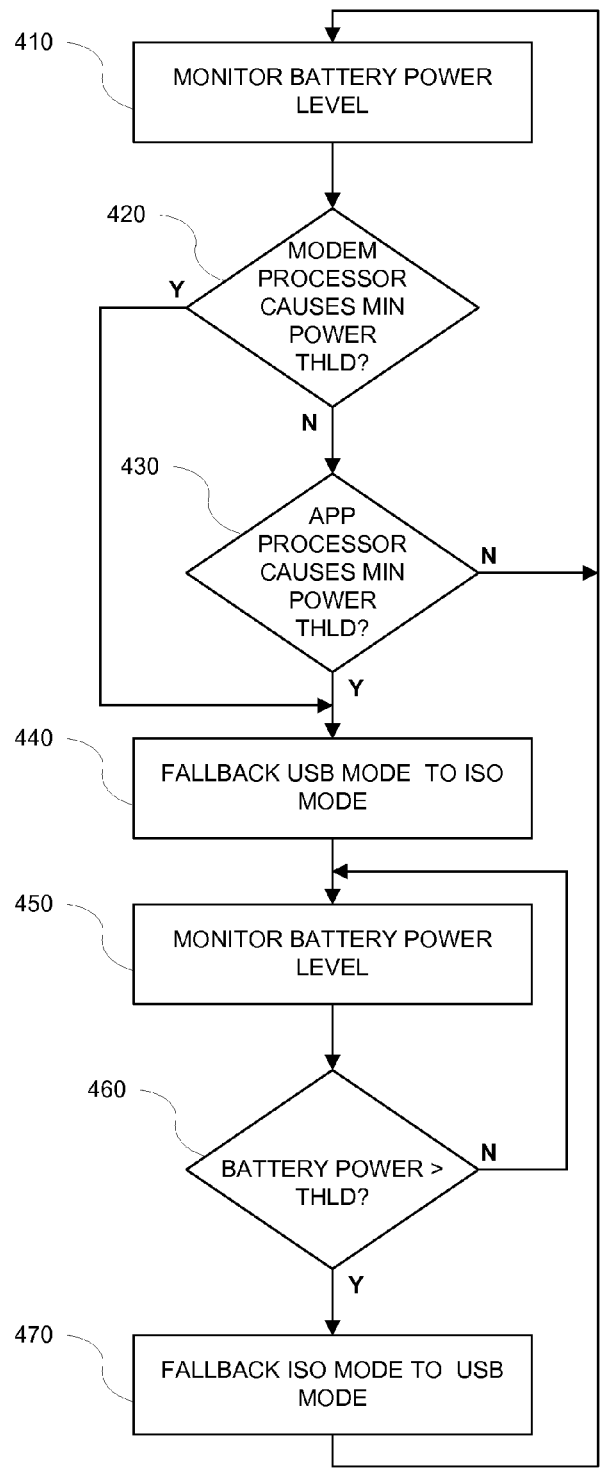
FIG. 4 is a flowchart illustrating a method for applying fallback conditions based on a battery minimum power level threshold according to various embodiments.

FIG. 4 is a flowchart illustrating a method 400 for applying fallback conditions based on a battery (e.g., 140 in FIG. 1) minimum power level threshold according to various embodiments. Referring to FIGS. 1-4, the battery 140 power level may be monitored by the system power monitor unit 130 (410). If the battery 140 minimum power threshold level is reached based on the modem processor 110 operating requirements (420-Y), the modem processor 110 may cause the application processor 170 to initiate UICC 120 fallback from the USB mode to the ISO mode (440).

If the battery 140 minimum power threshold level is not reached based on the modem processor 110 operating requirements (420-N), and the battery 140 minimum power threshold level is not reached based on the application processor 170 operating requirements (430-N), monitoring of the battery 140 power level continues (410). If the battery 140 minimum power threshold level is reached based on the application processor 170 operating requirements (430-Y), the application processor 170 may initiate UICC 120 fallback from the USB mode to the ISO mode (440).

After fallback from the USB mode to the ISO mode (440), the battery 140 power level monitoring continues (450). If the battery 140 power level remains below the battery 140 minimum power threshold level (460-N), monitoring of the battery 140 power level continues (450). If, however, the battery 140 power level rises above the battery 140 minimum power threshold level (460-Y), the application processor 170 may initiate UICC 120 fallback from the ISO mode to the USB mode.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A mobile communication device, comprising:
   a first processor configured to set an operational mode of a Universal Integrated Circuit Card (UICC) to an ISO 7816-12 USB UICC transmission protocol mode (USB mode); and
   a second processor configured to, in response to a user input, enable the UICC to fallback from the USB mode to an ISO 7816-3 T=0/T=1 transmission protocol mode (ISO mode).

2. The mobile communication device according to claim 1, wherein the second processor is configured to cause the UICC to fallback from the USB mode to the ISO mode based on one or more predetermined conditions.

3. The mobile communication device according to claim 2, wherein the predetermined conditions comprise one or more of a minimum battery power level, inability of the UICC to communicate in the USB mode, time of day, network services provider, and mobile communication device location.

4. The mobile communication device according to claim 3, further comprising a display device,
   wherein the predetermined conditions are user settable via menu selection presented on the display device.

5. The mobile communication device according to claim 2, wherein the second processor is configured to prevent fallback in response to one or more predetermined criteria.

6. The mobile communication device according to claim 5, wherein the predetermined criteria comprise one or more of a call in progress and an application program accessing the UICC.

7. The mobile communication device according to claim 1, further comprising:
a battery configured to provide power for the mobile communication device; and
a system power monitor unit configured to monitor a power level of the battery and provide an indication of the battery power level to the second processor,
wherein the second processor is configured to cause the UICC to fallback from the USB mode to the ISO mode when the indicated power level of the battery reaches a minimum power threshold level.

8. The mobile communication device according to claim 7, wherein the second processor is configured to cause the UICC to fallback from the ISO mode to the USB mode when the indicated power level of the battery rises above the minimum power threshold level.

9. The mobile communication device according to claim 7, wherein the battery minimum power threshold level is a user settable level.

10. The mobile communication device according to claim 7, wherein the battery minimum power threshold level is determined by the second processor based at least in part on an estimate by the second processor of power requirements of the first processor and the second processor.

11. The mobile communication device according to claim 1, wherein the first processor is a modem processor and the second processor is an application processor.

12. The mobile communication device according to claim 1, wherein the first processor and the second processor are the same processor.

13. A mobile communication device, comprising:
a first processor; and
a Universal Integrated Circuit Card (UICC) configured to operate in an ISO 7816-12 USB UICC transmission protocol mode (USB mode) and an ISO 7816-3 T=0/T=1 transmission protocol mode (ISO mode),
wherein the first processor is configured to cause the UICC to power up in the USB mode, and
if the UICC does not power up in the USB mode and fallback is enabled, to switch the operational mode of the UICC from the USB mode to the ISO mode.

14. The mobile communication device according to claim 13, further comprising a display device configured to display one or more user selectable options for determining operation of the UICC; and
an input device configured to select at least one of the one or more user selectable options,
wherein one of the one or more user selectable options enables fallback.

15. The mobile communication device according to claim 13, further comprising a second processor configured to enable the UICC to fallback from the USB mode to the ISO mode in response to a user input.

16. The mobile communication device according to claim 15, further comprising:
a battery configured to provide power for the mobile communication device; and
a system power monitor unit configured to monitor a power level of the battery and provide an indication of the battery power level to the second processor,
wherein the second processor is configured to cause the UICC to fallback from the USB mode to the ISO mode when the indicated power level of the battery reaches a minimum power threshold level.

17. The mobile communication device according to claim 16, wherein the second processor is configured to cause the UICC to fallback from the ISO mode to the USB mode when the indicated power level of the battery rises above the minimum power threshold level.

18. The mobile communication device according to claim 16, wherein the battery minimum power threshold level is determined by the second processor based at least in part on an estimate by the second processor of power requirements of the first processor and the second processor.

19. The mobile communication device according to claim 15, wherein the first processor is a modem processor and the second processor is an application processor.

20. The mobile communication device according to claim 15, wherein the first processor and the second processor are the same processor.

21. A method for switching a Universal Integrated Circuit Card (UICC) transmission protocol, the method comprising:
setting an operational mode of the UICC to an ISO 7816-12 USB UICC transmission protocol mode (USB mode); and
in response to a user input, enabling the UICC to fallback from the USB mode to an ISO 7816-3 T=0/T=1 transmission protocol mode (ISO mode).

22. The method according to claim 21, further comprising causing the UICC fallback from the USB mode to the ISO mode based on one or more predetermined conditions.

23. The method according to claim 22, wherein the predetermined conditions comprise one or more of a minimum battery power level, inability of the UICC to communicate in the USB mode, time of day, network services provider, and mobile communication device location.

24. The method according to claim 23, further comprising setting the predetermined conditions via menu selection presented on a display device.

25. The method according to claim 22, wherein fallback is prevented in response to one or more predetermined criteria.

26. The method according to claim 25, wherein the predetermined criteria comprise one or more of a call in progress and an application program accessing the UICC.

27. The method according to claim 21, further comprising:
monitoring a power level of a battery; and
providing an indication of the battery power level,
causing the UICC to fallback from the USB mode to the ISO mode when the indicated power level of the battery reaches a minimum power threshold level.

28. The method according to claim 27, further comprising causing the UICC to fallback from the ISO mode to the USB mode when the indicated power level of the battery rises above the minimum power threshold level.

29. The method according to claim 27, further comprising setting the battery minimum power threshold level based on a user input.

30. The method according to claim 27, further comprising determining the battery minimum power threshold level based at least in part on an estimate of power requirements of a first processor and a second processor.

\* \* \* \* \*